July 11, 1967     R. J. EVERITT     3,331,002
SEALED CAPACITOR HAVING HYDROGEN ABSORBING MATERIAL THEREIN
Filed Oct. 10, 1963
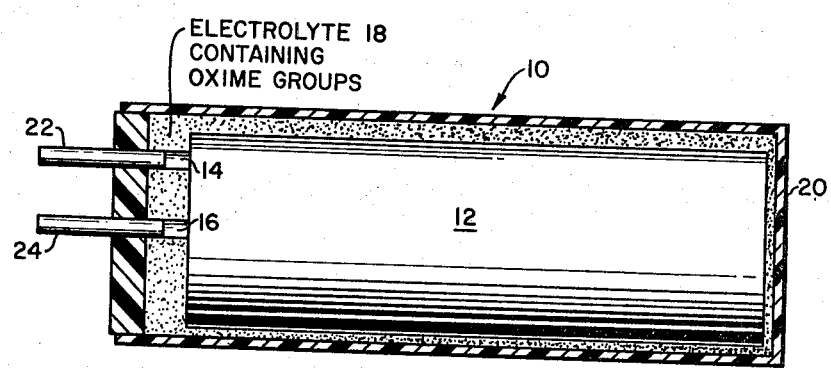
INVENTOR.
RONALD JOHN EVERITT
BY
ATTORNEY

United States Patent Office 3,331,002
Patented July 11, 1967

3,331,002
SEALED CAPACITOR HAVING HYDROGEN ABSORBING MATERIAL THEREIN
Ronald John Everitt, Eastcote, England, assignor to Cornell-Dubilier Electric Corporation, a corporation of Delaware
Filed Oct. 10, 1963, Ser. No. 316,485
7 Claims. (Cl. 317—230)

ABSTRACT OF THE DISCLOSURE

The invention relates to a normally hydrogen free electrolytic capacitor wherein the electrolyte includes an organic compound with oxime groups in the molecular structure for absorbing free hydrogen.

This invention relates to an electrolytic capacitor, especially of the sub-miniature kind, and also to a capacitor element, especially of the rolled kind, for incorporation in an electrolytic capacitor.

One factor which can limit the useful life of an electrolytic capacitor, and also cause steady deterioration of the efficiency of the capacitor throughout such life, is the generation of gas by electrolytic action largely as a result of imperfections, which are not readily avoidable, in the anodic film. The generation of gas often results in use in a reduction in the effective capacitance due to formation of a gas film on the electrodes, and may lead to breakdown of the capacitor when the gas pressure within the capacitor container builds up sufficiently high to break the container seal.

While both oxygen and hydrogen are liberated within the electrolytic capacitor in use thereof, the oxygen is largely consumed in reforming the oxide film on the anode, so that the harmful effects on the capacitor are mainly due to unabsorbed hydrogen gas.

For overcoming the disadvantageous effects of hydrogen gas generated in the capacitor, it has been proposed to absorb such gas by the incorporation of reducible compounds, either as solutions or dispersions in the electrolyte or as coatings on the negative electrode.

The object of the present invention is to provide a new and efficient hydrogen absorbent for an electrolytic capacitor, especially of the sub-miniature type, whereby the harmful effects due to the release of hydrogen in use of such capacitor are substantially avoided.

According to one feature of the present invention, an electrolytic capacitor incorporates, as an absorbent for hydrogen gas, a small quantity of an organic compound having as part of its structure one or more oxime groups.

It has been found that the presence of a small amount of such reducible organic compound permits the absorption of a large quantity of generated hydrogen, and that the products of the reduction process do not adversely affect the working of the capacitor. The tendency for the effective capacitance to diminish during use is thus substantially avoided, and the useful life of the capacitor is extended.

An especially useful hydrogen absorbent is quinone dioxime. The reducible compound in question may conveniently be incorporated as a solute in the electrolyte. Alternatively, however, such reducible compound may be incorporated in the capacitor element, which is itself incorporated in the electrolytic capacitor, especially in the case of a sub-miniature capacitor.

Thus, according to a further feature of the invention, an electrolytic capacitor, especially of the sub-miniature type, incorporates a capacitor element of the rolled kind which itself incorporates, as an absorbent for hydrogen gas, a small quantity of an organic compound, for example quinone dioxime, having as part of its structure one or more oxime groups.

When the capacitor element is produced in the well-known way by winding into a roll conducting foil strips with one or more absorbent separating strips, the reducible compound in question may conveniently be incorporated as an impregnant in the separating strip. When in producing such a capacitor element the conducting strips are secured before winding to the separating strip or strips by means of an adhesive, the compound may alternatively be incorporated as a dispersion in such adhesive.

The invention is especially useful in a sub-miniature capacitor element having electrodes of tantalum or aluminum.

A practical arrangement of electrolytic capacitor within the scope of the invention will now be described by way of example.

The above objects, features and novel advantages will become apparent to those skilled in the art from the following discussion taken in conjunction with the accompanying drawings in which:

The figure is a view, in cross section, of an electrolytic capacitor fabricated according to the teachings of this invention.

In this arrangement, the electrolytic capacitor 10 is of the sub-miniature kind and incorporates a rolled capacitor element 12. This capacitor element is preferably produced in accordance with the method described and claimed in the present applicants' British Patent No. 891,327. In accordance with this method, the capacitor electrodes are wound from two lengths of aluminum foil strip previously formed with a dielectric layer in the form of an oxide coating and with terminal posts attached, together with a separator constituted by absorbent paper strip. The two conducting strips are secured in non-overlapping relationship respectively to opposite faces of the paper strip by means of an adhesive, being positioned so that one terminal post 14 is near one end of the paper strip and the other terminal post 16 is near the center of the length thereof. The assembly of strips is then wound into a roll 12 by rotating the terminal post located near the center of the paper strip, thereby first folding the assembly and then winding such folded assembly into a roll.

In accordance with the present invention, a small quantity of quinone dioxime in the form of a powder is incorporated in the adhesive utilized to secure the conducting strips to the paper strip before winding into the roll. Suitable adhesives for acting also as the carrier for the quinone dioxime may be prepared from gelatine or agar or methyl cellulose for example.

The electrolytic capacitor is completed by the incorporation of the rolled capacitor element 12 with an electrolyte 18 in a sealed container 20, the capacitor terminals 22, 24 projecting through such container and within such container being connected to the above-mentioned terminal posts.

It will be appreciated that the quinone dioxime, or other organic compound incorporating as part of its structure one or more oxime groups, may be incorporated in the electrolytic capacitor in various ways other than that above described. For example, the absorbent separating strip may be impregnated with a solution of such compound, either before or after the strip assembly is wound into a roll. Alternatively, the compound may not be incorporated in the capacitor element, but may constitute a solute in the electrolyte in the capacitor.

However incorporated, it is found that the presence of a small quantity of quinone dioxime or other organic oxime compound in the electrolytic capacitor permits the absorption of a large quantity of hydrogen generated within the capacitor in use, and the products formed as a result of reduction of such compound have no harmful effect on the working of the capacitor. The invention is especially useful in electrolytic capacitors, especially of the sub-miniature type, to prevent the formation of gas films on the electrodes in use, and thereby to render the capacitor more efficient, and also to extend the life of the capacitor by minimizing risk of breakdown due to rupture of the container seal due to high internal gas pressure.

What I claim is:

1. An electrolytic capacitor comprising spaced electrodes and an electrolyte in contact with the electrodes, at least one of said electrodes having a dielectric oxide film on its surface, said electrolyte containing reactive components productive of free hydrogen and an organic compound having a plurality of oxime groups in its molecular structure, said oxime groups being absorbent of free hydrogen in the electrolyte.

2. An electrolytic capacitor as claimed in claim 1 in which the hydrogen absorbent is constituted by quinone dioxime.

3. A capacitor as in claim 1 enclosed within a sealed container and wherein said electrodes are aluminum or tantalum strips rolled into a spiral body with an absorbent paper strip disposed between the electrodes and with the electrolyte impregnated in the paper strip.

4. A capacitor as in claim 3 in which the hydrogen absorbent is constituted by quinone dioxime.

5. A capacitor as in claim 3 in which the paper separator strip is impregnated with said compound.

6. A capacitor as in claim 3 in which the foil strips are secured to the paper strip by an adhesive and said compound is dispersed in said adhesive.

7. A capacitor as in claim 3 in which said compound is incorporated as a solute in the electrolyte.

References Cited

UNITED STATES PATENTS

| 2,716,721 | 8/1955 | Houtz et al. | 317—230 |
| 2,910,633 | 10/1959 | Hovey | 317—230 |
| 3,052,829 | 9/1962 | Ross | 317—230 |

FOREIGN PATENTS

| 811,331 | 4/1959 | Great Britain. |

JAMES D. KALLAM, *Primary Examiner.*